United States Patent [19]

Korenberg

[11] Patent Number: 5,218,815
[45] Date of Patent: Jun. 15, 1993

[54] METHOD AND APPARATUS FOR GAS TURBINE OPERATION USING SOLID FUEL

[75] Inventor: Jacob Korenberg, York, Pa.

[73] Assignee: Donlee Technologies, Inc., York, Pa.

[21] Appl. No.: 710,120

[22] Filed: Jun. 4, 1991

[51] Int. Cl.$^5$ ............................................. F02G 3/00
[52] U.S. Cl. .................. 60/39.05; 60/39.12; 60/39.55
[58] Field of Search .................. 60/39.05, 39.12, 39.53, 60/39.55

[56] References Cited

U.S. PATENT DOCUMENTS

| | | |
|---|---|---|
| 2,115,338 | 4/1938 | Lysholm . |
| 2,186,706 | 1/1940 | Martinka . |
| 2,602,289 | 7/1952 | Anxionnaz et al. . |
| 2,869,324 | 1/1959 | Foote . |
| 3,335,565 | 8/1967 | Aguet . |
| 3,379,009 | 4/1968 | Sharp et al. . |
| 3,461,667 | 8/1969 | Aguet . |
| 3,657,879 | 4/1991 | Ewbank et al. . |
| 3,731,485 | 5/1973 | Rudolph et al. . |
| 3,877,218 | 4/1975 | Nebgen . |
| 4,150,953 | 4/1979 | Woodmansee ............... 60/39.12 |
| 4,368,103 | 1/1983 | Weinzierl et al. ............ 60/39.12 |
| 4,418,527 | 12/1983 | Schlom et al. . |
| 4,444,007 | 4/1984 | Mitchell et al. .............. 60/39.12 |
| 4,448,018 | 5/1984 | Sayama et al. . |
| 4,478,039 | 10/1984 | Horgan ........................ 60/39.12 |
| 4,537,023 | 8/1985 | Nakamura et al. . |
| 4,610,137 | 9/1986 | Nakamura et al. . |
| 4,785,622 | 11/1988 | Plumley et al. .............. 60/39.12 |
| 4,802,445 | 2/1989 | Robertson, Jr. .............. 60/39.12 |
| 4,829,763 | 5/1989 | Rao . |

FOREIGN PATENT DOCUMENTS 3642619 6/1988 Fed. Rep. of Germany ..... 60/39.12

Primary Examiner—Richard A. Bertsch
Assistant Examiner—Michael I. Kocharov
Attorney, Agent, or Firm—Finnegan, Henderson, Farabow, Garrett & Dunner

[57] ABSTRACT

A gas turbine cycle in which air is compressed to superatmospheric pressure, water is circulated in heat exchange relation with the compressed air to convert the sensible heat therein to heated water, the compressed air is humidified using the heated water, the humidified air is heated with sensible heat in the turbine exhaust gases, and a solid fuel such as coal is converted to a motive fluid for driving the gas turbine by substoichiometrically burning solid fuel under superatmospheric pressure using oxygen from the heated humidified air for combustion of the solid fuel and to produce combustible fuel gas and char, above stoichiometrically and adiabatically burning the char under superatmospheric pressure by supplying the heated humidified air in sufficient quantity to provide oxygen for combustion of the char and to control the temperature of such combustion, thereby to produce char combustion gases containing oxygen, cleaning the combustible fuel gas and the char combustion gasses to remove particulate materials therefrom, and burning the combustible fuel gas under superatmospheric pressure, oxygen for combustion of the gases being supplied by the char combustion gases and the heated humidified air, and the temperature of such gas combustion being controlled by the quantity of heated humidified air supplied for burning the fuel gas and the char combustion gases, the products of such gas combustion providing the motive fluid for driving the turbine.

7 Claims, 3 Drawing Sheets

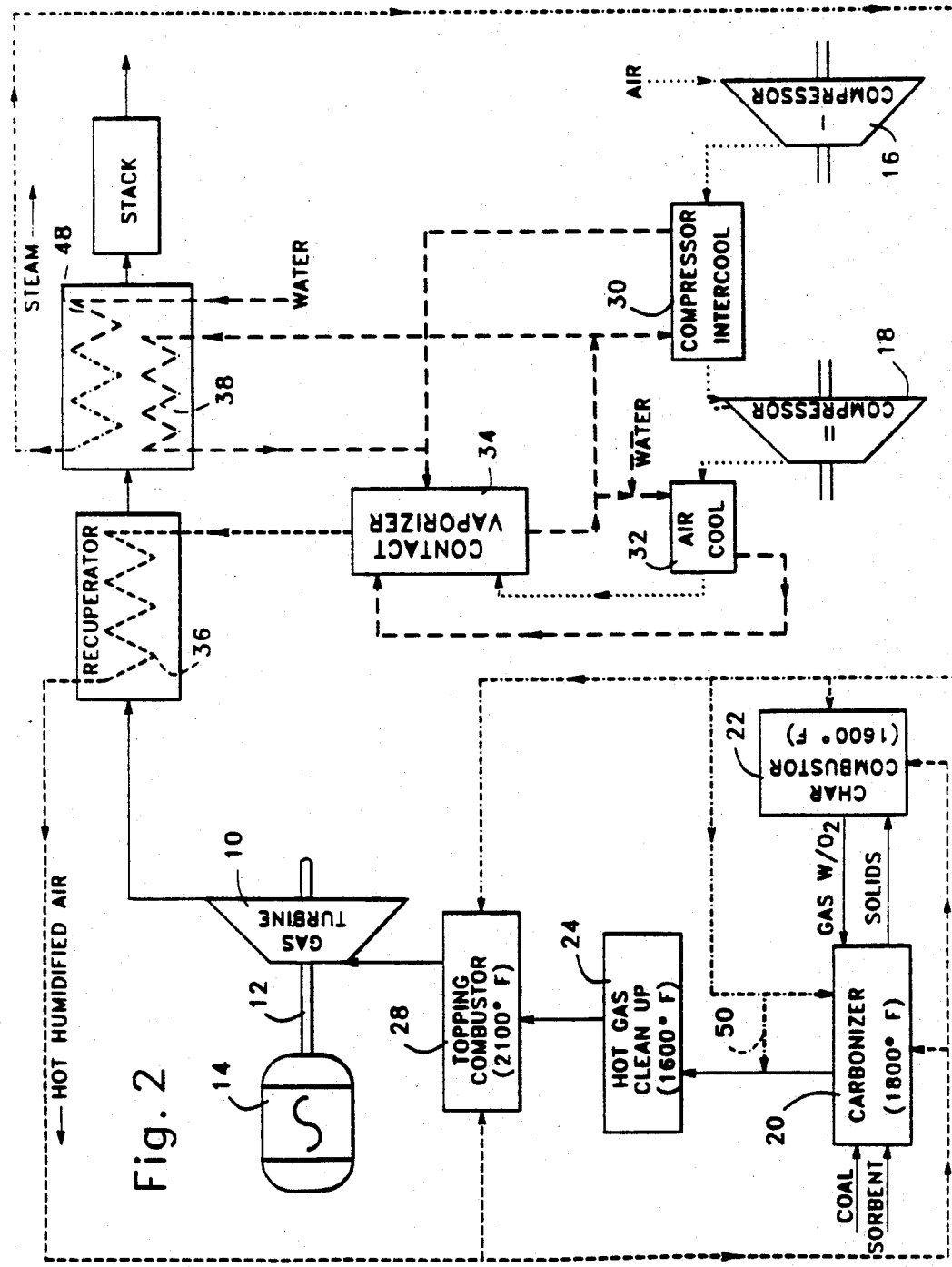

Fig. 3

| | | EMBODIMENT OF FIG. 1 | | EMBODIMENT OF FIG. 2 | 2ND GEN. COMB. CYCLE - P. 2-4 |
|---|---|---|---|---|---|
| | PRESSURE (ATMOS.) | 14 | 24 | 24 | 14 |
| | TURBINE INLET TEMP. (°F) | 2100 | 2275 | 2300 | 2100 |
| AIR FLOW RATE | TOTAL | 1480 | 1574 | 1235 | 1397 |
| | CARBONIZER 20 | 186 | 172 | 286 | 136 |
| | CHAR COMBUSTOR 22 | 878 | 1326 | 64 | 965 |
| | TOPPING COMBUSTOR 28 | 416 | 76 | 885 | 296 |
| EXCESS AIR % | CHAR COMBUSTOR 22 | 285 | 465 | 20 | 211 |
| | OVERALL | 112 | 125 | 76 | 106 |
| AIR & GAS TEMP. °F AFTER | COMPRESSOR 16 | 330 | 397 | 400 | 711 |
| | COMPRESSOR 18 | 430 | 630 | 598 | |
| | CARBONIZER 20 | 1600 | 1600 | 1800 | 1500 |
| | PARTICULATE CLEAN-UP 24 | 1600 | 1600 | 1600 | 1500 |
| | PARTICULATE CLEAN-UP 26 | 1600 | 1600 | | 1600 |
| | CHAR COMBUSTOR 22 | 1600 | 1600 | 1600 | 1600 |
| | RECUPERATOR 36 | 787 | 1043 | 915 | |
| | ECONOMIZER 38 | 260 | 320 | 290 | 280 |
| | CONTACT VAPORIZER 34 | 290 | 310 | 302 | |
| | FEEDWATER FLOW | 368 | 278 | 343 | 369 |
| | STEAM FLOW | 368 | 278 | 313 | 369 |
| | BOILER BLOWDOWN | | | 30 | |
| FW TEMP AFTER °F | COMPRESSOR INTERCOOLER 30 | 320 | 340 | 330 | |
| | ECONOMIZER 38 | 320 | 340 | 330 | 668 |
| | % CARBON CONVERSION IN CARBONIZER | 65 | 65 | 93 | 55 |
| | CYCLE EFFICIENCY | 43.3 | 50.7 | 47.6 | 44.1 |

All flow rates are in lb per 100 lb of coal water fuel (30% water and 70% solids)
HHV = 12,450 BTU/lb at M = 6%   Where: HHV = High Moisture Content and
M = Moisture Content

METHOD AND APPARATUS FOR GAS TURBINE OPERATION USING SOLID FUEL

BACKGROUND OF THE INVENTION

1. Field of the Invention

This invention relates to solid fuel burning power plants and, more particularly, it concerns a method and apparatus for converting solid fuel, such as coal, to a motive fluid for driving a gas turbine used to generate electric power.

2. Description of the Related Art

Recent developments in coal burning power plants include pressurized fluidized bed combustion/combined cycle systems by which gaseous products of combustion and steam are used to drive respective gas and steam turbines for the generation of electricity. In such systems, combustion efficiency is enhanced by operation of fluidized bed combustors under superatmospheric pressure while combustion temperatures are maintained within ranges at which sulphur is absorbed, formation of nitrogen oxides is limited, and the metallurgical limits of gas turbine operating temperatures are satisfied. The combination of energy conversion efficiency, environmental acceptability and abundance of high sulphur coal has generated a high degree of interest in such systems by the power plant industry.

It is well known in the fluidized bed combustor art that sulphur contained in coal can be removed by burning crushed coal and a sorbent such as limestone or dolomite in fluidized bed during combustion of the coal and removing the sulphur laden sorbent from the system as dry waste. The temperature at which sulphur is most effectively removed from coal in this manner is in the region of 1600° F. Also, combustion at this temperature substantially avoid the formation of air polluting oxides of nitrogen.

In a first generation of pressurized fluidized bed/combined cycle systems, the fluidized bed is operated at superatmospheric pressure on the order of five to six atmospheres to enhance the combustion process without excessive air velocities. Also, the compressed hot flue gases from the combustion process are cleaned of particulate material and used directly as the motive fluid for driving the gas turbine of the combined cycle. The temperature of the combustion in the fluidized bed is maintained by heat exchange transfer from the bed to provide superheated steam for driving the steam turbine of the combined cycle system. A difficulty in encountered with such first generation systems is that power converted by the gas turbine is limited by the combustion temperatures and pressures of the system. Given the operating parameters of the system and the limits of steam turbine efficiency, any increased power plant capacity is attainable only by increasing already very large combustor and steam turbine components.

In a second generation of pressurized fluidized bed/combined cycle systems, the ratio of power developed by the gas turbine to that developed by the steam turbine is significantly increased by using a two-stage solid fuel superatmospheric combustion process in which coal is first burned substoichiometrically in a pressurized fluidized bed combustor called a "carbonizer" to convert a substantial percentage of carbon in the coal to combustible fuel gas. Sorbent is fed with the coal to the carbonizer for removal of sulphur. Char and calcium sulfide remaining from this conversion are then burned at above stoichiometric conditions in a circulating fluidized bed char combustor from which heat is extracted by circulating the fluidized bed contents of the char combustor through a fluidized bed heat exchanger for the development of superheated steam to drive the steam turbine and generate electricity.

Hot fuel and flue gases from the respective carbonizer and the char combustor are cleaned separately in hot gas particulate clean up systems and the cleaned gases are directed into a topping combustor where they are mixed with compressed air and burned at temperatures approaching but not exceeding the metallurgical limits of the gas turbine (2100°-2300° F.). Hot gases from the topping combustor at approximately the same temperature and under system superatmospheric pressure are then expanded in the gas turbine. Surplus of mechanical work generated by the gas turbine (i.e., remaining after compressor operation for pressurizing the system) is also converted into electricity. Gases exhausted from gas turbine are cooled down in a heat recovery portion of the steam cycle and then exhausted to the atmosphere.

The fluidized bed heat exchanger of the second generation system, by which combustion temperatures are controlled in the char combustor and in which superheated steam is generated, requires a low fluidizing velocity to avoid tube erosion and therefore a large fluidized bed cross-sectional area is required to accommodate heat transfer surface. As a result of these requirements and the need for operation at the superatmospheric pressure of the system, the fluidized bed heat exchanger is one of the largest components of the second generation system. In a 225 MW power plant, for example, this heat exchanger occupies a space of 32,000 cubic feet. Moreover, it represents approximately 12% of the total plant cost.

Also, the pressurized char combustor, which operates at about 210% excess air for a) maintaining the turbine inlet temperature of 2100° F., and b) reliable burning of the char and calcium sulfide, is, in itself, a very large and tall component of the system (approximately 36,000 cubic feet for a 225 MW plant). The large size of the char combustor in the known second generation system is due to several factors, such as the need for a relatively high gas residence time at the high amount of excess air to attain above stoichiometric combustion of the char without excessive combustion gas velocities in the char combustors, the space required for the fluidized bed heat exchanger, and the amount of carbon containing char remaining from the carbonizer.

While the art relating to solid fuel burning combined cycle power plants has reached an advanced stage of development, there is need for improvement particularly in reducing component size and costs associated therewith.

SUMMARY OF THE INVENTION

A principal object of the invention is the provision of a method and apparatus for converting the potential energy of solid fuel, such as coal, to usable power in an efficient manner and by which the size and capital costs of equipment for implementing the conversion are reduced relative to known power plant equipment of comparable power producing capacity.

Another object of the invention is to provide such a method and apparatus by which the power producing capacity of known combined gas and steam turbine cycle power plants is matched using a gas turbine cycle only, thereby avoiding plant size and costs applicable to the steam turbine cycle.

A further object of the invention is the provision of such a method and apparatus by which the temperatures of combustion processes used are maintained within acceptable limits for avoiding air pollution and effective gas turbine operation without transfer of heat from the respective combustion processes.

A still further object of the invention is to provide such a method and apparatus by which flue gas cleanup from fluidized bed combustors is simply and effectively carried out.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a gas turbine cycle in which air is compressed to superatmospheric pressure, water is circulated through a compressor inter-cooler in heat exchange relation with the compressed air to convert the sensible heat therein to heated water, the compressed air is humidified using the heated water, the humidified air is heated with sensible heat in the turbine exhaust gases, and a solid fuel such as coal is converted to a motive fluid for driving the gas turbine by substoichiometrically burning solid fuel under superatmospheric pressure using oxygen from the heated humidified air for combustion of the solid fuel and to produce combustible fuel gas and char, above stoichiometrically and adiabatically burning the char under superatmospheric pressure by supplying the heated humidified air in sufficient quantity to provide for combustion of the char and to control the temperature of such combustion, thereby to produce char combustion gases containing oxygen, cleaning the combustible fuel gas and the char combustion gasses to remove particulate materials therefrom, and burning the combustible fuel gas and the char combustion gases under superatmospheric pressure, oxygen for combustion of the gases being supplied by the char combustion gases and the heated humidified air, and the temperature of such gas combustion being controlled by the quantity of heated humidified air supplied for burning the fuel gas and the char combustion gases, the products of such gas combustion providing the motive fluid for driving the turbine.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 2 is a similar illustration depicting an alternative embodiment of the invention; and FIG. 3 is a table of operating parameters for the system embodiments of the invention.

DESCRIPTION OF THE PREFERRED EMBODIMENT

Figure 1:
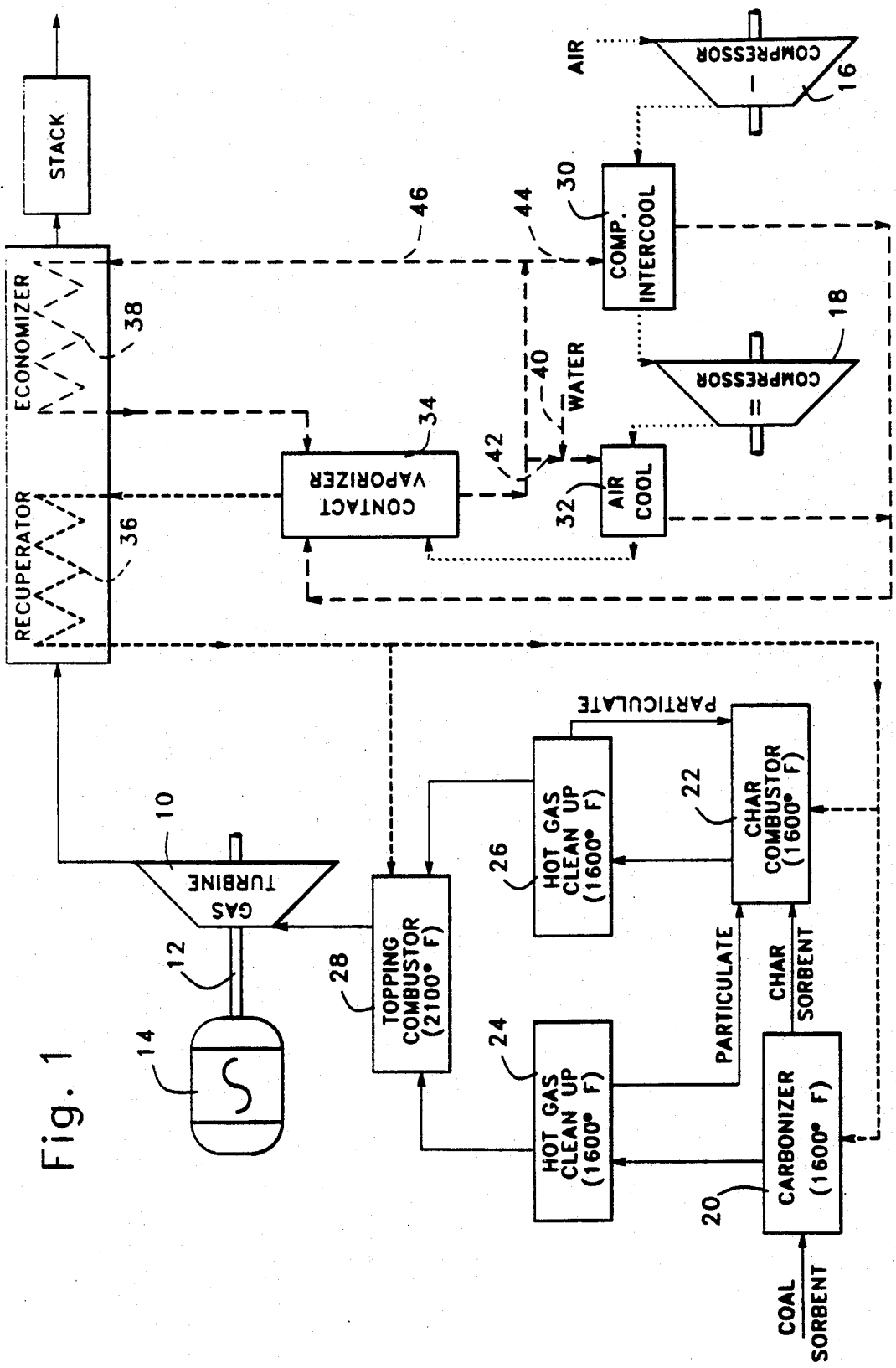
FIG. 1 is a schematic illustration in block diagram form depicting a first embodiment of the invention.

Reference will now be made in detail to the present exemplary embodiments of the invention, examples of which are illustrated in the accompanying drawings. Wherever possible, the same reference numbers will be used throughout the drawings to refer to the same or like parts.

In FIG. 1 of the drawings, the method and apparatus of the present invention is embodied in a power plant illustrated schematically with major components thereof represented essentially in block diagram form. Thus, a gas turbine 10 is shown having an output shaft 12 for driving electric generator 14 for the supply of electrical energy. First and second stage compressors 16 and 18, respectively, are included and, although illustrated in spaced relationship to the gas turbine 10, are in practice driven by the gas turbine. All conduits and components between the second stage compressor 18 and the gas turbine 10 are maintained under the gas pressures developed by the two compressor stages 16 and 18 and in practice may be in the range of between 6 and 30 atmospheres.

The energy for driving the gas turbine 10 is supplied by a solid fuel such as coal introduced into a carbonizer 20 which is operated substoichiometrically to produce flue gases rich in combustible fuel. In practice, the carbonizer 20 could be a fluidized bed type of combustor to which granulated coal and sorbent such as limestone or dolomite are fed.

Char remaining from the combustion process in the carbonizer 20 is fed with sorbent to a char combustor 22 in which any remaining carbon in the char is converted by combustion at above stoichiometric conditions to flue combustion gases. The flue gases from the char combustor are rich in oxygen as a result of the char combustor 22 operating at above stoichiometric conditions. Any type of char combustor 22 can be used.

The fuel rich flue gases from the carbonizer 20 are fed to a hot gas clean up unit 24 which removes particulate materials from the flue gases and returns the particulate materials to the char combustor 22. Similarly, the oxygen rich flue gases from the char combustor 22 are fed to a hot gas clean up unit 26 where particulate materials are separated from the flue gases and returned to the char combustor. Although not depicted in FIG. 1, the solid products of combustion and sorbent are withdrawn from the char combustor for disposal.

The cleaned gases passing from the cleaning units 24 and 26 are passed to a topping combustor 28 in which the combustible fuel gases are burned at temperatures in the region of the metallurgical limits of the gas turbine 10 and expanded through the turbine.

In accordance with the present invention, the respective combustion processes which take place in the carbonizer 20, the char combustor 22 and the topping combustor 28 are adiabatic, that is, no heat is withdrawn for purposes of combustion temperature control. Instead, the temperature of the carbonizer 20 is maintained by the rate of air supplied to and rate of solid fuel at which it is fed to and withdrawn as char from the carbonizer whereas the combustion temperatures in the char combustor 22 and in the topping combustor 28 are maintained by quantity and characteristics of air supplied to support combustion in those combustors. In the embodiment of the present invention illustrated in FIG. 1, air for combustion in the carbonizer 20 and in the combustors 22 and 28 is supplied by the second stage compressor 18 after having been heated and humidified in a manner to be described in more detail below.

As represented by dotted lines and arrows in FIG. 1, ambient air is supplied to the first stage compressor 16 and passed to the intake of the second stage compressor 18 after being cooled by passage through a compressor inter-cooler 30. The compressed air discharged from the second stage compressor 18 is cooled by passage through a further cooling device 32 and then to a contact vaporizer 34. In the contact vaporizer 34, the compressed air is saturated with water vapor at a designed optimum temperature. As represented by short-dash lines in FIG. 1, humidified air from the contact vaporizer 34 is fed through a recuperator of 36 where the humidified air is heated by turbine exhaust gases to a maximum practical temperature. From the recuperator 36, the hot humidified air is supplied in separate streams to the carbonizer 20, the char combustor 22, and the topping combustor 28 to support the combustion in these respective combustors.

In FIG. 1, the flow path for water used to humidify the compressed air is represented by long-dash lines and arrows. As so illustrated, cold feed water 40 is supplied to the air cooler 32 and then to the contact vaporizer 34 in which it is vaporized and added to the compressed air as aforementioned. Water flowing from the contact vaporizer 34 is divided into three streams. A first stream 42 is mixed with the cold feed water passed through the air cooler 32. A second stream 44 is passed through the compressor inter-cooler 30 for return with the water passing the air cooler 32 to the contact vaporizer 34. A third stream 46 of water passing from the contact vaporizer 34 is fed to an economizer 38, where the water is heated by turbine exhaust gases, and the heated water is returned to the contact vaporizer 34.

The use of hot humidified air to support combustion in the carbonizer 20 and char combustor 22 is particularly significant from the standpoint of reducing the carbon conversion work done by the char combustor 22. The supply of water vapor in the humidified air fed to the carbonizer 20 enables the conversion of a high percentage of the carbon in the carbonizer supplied coal to combustible flue gases. As a result, the carbon containing char remaining for combustion in the char combustor 22 is reduced. This, in turn, enables some reduction in the size of the char combustor as compared with the second generation combined cycle plant previously described.

Also, combustion temperature in the char combustor 22 is controlled completely adiabatically by supply of excess of humidified air to keep combustion temperatures in the char combustor to within the range of temperatures required for absorption of sulfur. The resulting elimination of the fluidized bed heat exchanger of the prior second generation combined cycle system, in itself, represents a major reduction of overall plant size and cost. Also, the potential for size reduction of the char combustor 22 of the present invention, particularly as compared with that of the second generation combined-cycle plant, facilitates use of pressure vessel enclosures for the char combustor by which pressures of up to 30 atmospheres and higher may be used.

In FIG. 2, an alternative embodiment of the invention is illustrated with parts previously identified designated by the same reference numerals. Similarly, the same line form conventions are used to represent flow paths for air, humidified air and water. The major difference between the embodiments of FIGS. 1 and 2 is that in the latter embodiment, the carbonizer 20, the char combustor 22 and the topping combustor 28, though supplied with hot humidified air as in the embodiment of FIG. 1, are additionally supplied with steam generated from feed water supplied to a heat recovery steam generator 48 located to extract heat from the exhaust gases of the turbine 10. The flow paths for steam passing from the generator 48 are represented in the double-dash-dot lines in FIG. 2.

While the addition of steam to the char combustor 22 and topping combustor 28 result primarily in enhanced control over the temperature of the respective combustion processes which take place in these combustors, the efficiency of the carbonizer 20 is significantly enhanced. In particular, the addition of steam along with combustion temperature increase in the carbonizer 20 allows for conversion of about 88-92 percent of the coal contained carbon to combustible fuel gas. Because of the reducing atmosphere, the carbonizer can be operated at temperatures on the order of about 1800° F. without adversely affecting the absorption of sulfur from the coal.

The increased conversion of carbon in the carbonizer 20, in turn, reduces the amount of char to be burned in the char combustor 22 and, correspondingly, the required size of the char combustor. Hence, the size of the char combustor 22 in the embodiment of FIG. 2 is reduced beyond that of the same unit described above with reference to FIG. 1. Moreover, the excess air supplied to the char combustor 22 for adiabatic combustion provides flue gases from the char combustor which are adequately rich in oxygen to support combustion in the carbonizer 20. Thus, and as shown in FIG. 2, the flue gases from the char combustor 22 are directed back to the carbonizer 20. As a result, the hot gas cleanup requirements of the overall system is drastically reduced.

Because of the higher combustion temperatures in the carbonizer 20, it may be necessary in practice to cool the flue gases from the carbonizer prior to cleanup. It is contemplated, therefore, that a portion of the steam from the generator 48 will be supplied to the flue gases passing from the carbonizer 20 to the hot gas cleanup unit 24, as represented by a branch steam line 50 in FIG. 2.

In the accompanying drawings, components of the apparatus used in the practice of both described embodiments of the present invention are illustrated schematically in block diagram form. Such components, per se, are well known in the art and for a given capacity system, are conventionally designed and built for calculated operating parameters of that system. FIG. 3 of the drawings is a table in which calculated operating parameters for each of the components in both embodiments described above with reference to FIGS. 1 and 2 are shown in three columns and twenty-four rows of numerical data together with corresponding data for the second generation combined cycle system generally described above at pages 2-4 of this application. For the embodiment of FIG. 1, parameter data is shown for operation of that embodiment at both 14 and 24 atmospheres of pressure, respectively, whereas data for only one operating pressure is given for the other two systems represented in FIG. 3.

Having the data provided in FIG. 3, such components as the carbonizers 20 and the char combustors 22 for the respective embodiments of FIGS. 1 and 2 can be designed and built using conventional fluidized bed, solid fuel burning combustion devices. Similarly, the apparatus used for the hot gas clean-up devices 24 and 26 as well as for the topping combustor 28 can be designed and built using conventional and well known technology. The contact vaporizer 34 used in both embodiments of the invention is preferably represented by a distillation tower having a gas (in this instance, air) inlet at its bottom and one or more liquid (in this instance, water) inlets at the top thereof. The operation of such devices is well known and results in the discharge of vapor or humidified air from the top end thereof and in the discharge of excess liquid or water at the bottom thereof. Heat exchange components used in both embodiments of the invention such as the compressor intercooler 30, the air cooler 32, the recuperator 36, the economizer 38 and the boiler 48 are, as schematically represented in the drawings, heat exchange devices in which one fluid is passed through heat exchange tubing adapted to transmit heat to or from the atmosphere in which the tubing is located.

It will be apparent to those skilled in the art that various modifications and variations can be made in the described and illustrated embodiments of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. The method for driving a gas turbine, said method comprising the steps of:
    substoichiometrically burning solid fuel under superatmospheric pressure in an atmosphere of heated humidified air to convert a substantial amount of carbon in the solid fuel to combustible fuel gas and to produce char containing the remaining carbon in the fuel;
    adiabatically burning said char under superatmospheric pressure in an environment of heated humidified air to control combustion temperature and provide oxygen for combustion of said char to produce char combustion gases containing oxygen;
    cleaning said combustible fuel gas and char combustion gases to remove particulate materials therefrom;
    burning said combustible fuel gas under superatmospheric pressure, oxygen for combustion of said fuel gas being supplied by said char combustion gases and heated humidified air, the heated humidified air being supplied in amounts adequate to control the temperature of fuel gas combustion;
    expanding the products of fuel gas combustion in the turbine to drive the turbine and to discharge exhaust gas having sensible heat; and
    removing sensible heat from said exhaust gas to heat humidified air supplied for burning said solid fuel, said char and said fuel gas.

2. In a gas turbine cycle, the method comprising the steps of:
    compressing air to superatmospheric pressure;
    circulating water in heat exchange relation with the compressed air to transfer the sensible heat in the compressed air to the circulated water and provide heated water;
    humidifying the compressed air using the heated water;
    heating the humidified air with sensible heat in the turbine exhaust gases; and
    converting solid fuel to a motive fluid for driving the gas turbine, said solid fuel converting step comprising:
    substoichiometrically burning solid fuel under superatmospheric pressure using oxygen from the heated humidified air for combustion of said solid fuel and to produce combustible fuel gas and char;
    above stoichiometrically and adiabatically burning said char under superatmospheric pressure by supplying the heated humidified air in sufficient quantity to provide oxygen for combustion of said char and to control the temperature of such combustion, thereby to produce char combustion gases containing oxygen;
    cleaning said combustible fuel gas and said char combustion gasses to remove particulate materials therefrom; and
    burning said combustible fuel gas under superatmospheric pressure, oxygen for combustion of said fuel gas being supplied by said char combustion gases and the heated humidified air, and the temperature of such gas combustion being controlled by the quantity of heated humidified air supplied for burning said fuel gas, the products of such gas combustion providing the motive fluid for driving the turbine.

3. The method recited in claim 2 wherein each of said burning steps is carried out additionally in the presence of steam.

4. The method recited in claim 3 wherein the step of burning solid fuel is carried out additionally in the presence of oxygen containing gases produced by burning said char.

5. The method recited in claim 3 including the step of generating steam using sensible heat from the turbine exhaust gas.

6. The method recited in either of claims 2 or 3 comprising the step of recirculating said char combustion gases containing oxygen to support said solid fuel burning and to supplement the combustible fuel gas produced by said solid fuel burning.

7. The method recited in claim 6 comprising the step of cooling the supplemented combustible fuel gas prior to said cleaning step.

* * * * *